United States Patent [19]
Dayani

[11] Patent Number: 5,517,682
[45] Date of Patent: May 14, 1996

[54] CLASS I CELLULAR MOBILE TELEPHONE APPARATUS

[75] Inventor: Oscar Dayani, Atlanta, Ga.

[73] Assignee: Mitsubishi Consumer Electronics America, Inc., Braselton, Ga.

[21] Appl. No.: 293,911

[22] Filed: Aug. 22, 1994

[51] Int. Cl.⁶ ................. H04B 1/38; H04M 1/00
[52] U.S. Cl. ............... 455/89; 455/90; 455/343; 455/346; 455/351; 379/58; 379/433
[58] Field of Search ............... 455/89, 90, 343, 455/345, 346, 348, 349, 350, 351, 95, 99, 100; 379/58, 59, 61, 433

[56] References Cited

U.S. PATENT DOCUMENTS

| | | |
|---|---|---|
| 5,029,205 | 7/1991 | Archer ........................... 379/433 |
| 5,170,494 | 12/1992 | Levanto ......................... 455/90 |
| 5,203,021 | 4/1993 | Repplinger et al. ............ 455/90 |
| 5,251,329 | 10/1993 | Takagi et al. .................. 455/89 |
| 5,265,158 | 11/1993 | Tattari ........................... 379/433 |
| 5,287,554 | 2/1994 | Furuno .......................... 455/89 |

*Primary Examiner*—Reinhard J. Eisenzopf
*Assistant Examiner*—Lee Nguyen
*Attorney, Agent, or Firm*—Rothwell, Figg, Ernst & Kurz

[57] ABSTRACT

A class 1 cellular mobile telephone apparatus has an LCD display and keypad provided in a transceiver main unit, which can be installed directly in a passenger compartment of a motor vehicle. The handset unit contains only a speaker and a microphone, eliminating the need for a microprocessor and associated supporting circuitry. The additional space within the handset is utilized for placement of a battery pack power supply for transportable operation of the apparatus. The apparatus is smaller, simpler and lighter in weight than conventional class 1 cellular apparatus.

3 Claims, 4 Drawing Sheets

CLASS I CELLULAR MOBILE TELEPHONE APPARATUS

BACKGROUND OF THE INVENTION

1 Field of the Invention

This invention is generally related to mobile radio communication apparatus such as cellular telephones, and more specifically is directed to a novel configuration for class 1 (i.e., 3 watt output power) cellular mobile telephone apparatus.

2 Background and Prior Art

Conventional class 1 cellular mobile telephones are characterized by their relative complexity, large size, and high cost. Class 1 cellular mobile telephones are typically that class of mobile telephones which are installed in motor vehicles.

FIG. 1 illustrates one conventional configuration for a class 1 cellular mobile telephone apparatus, which is adapted for fixed installation in an automobile. A transceiver main unit 10 is installed in the trunk of the automobile with the use of a mounting bracket 12. As is well-known, the transceiver transmits and receives cellular communication signals in the 800 Mhz frequency range established for cellular radio communications. A handset 14 is installed in the passenger compartment of the automobile typically in the vicinity of the driver's seat, being held by a handset cradle 16. The handset unit includes a keypad, a display such as an LCD (liquid crystal display), a speaker and microphone and associated audio circuitry, and a microprocessor. The transceiver main unit 10 is connected to the vehicle battery via a power cable 18. A second cable 20 is also required for connection of the handset cradle unit 16 to the transceiver main unit 10 to enable the user to control the transceiver main unit through activation of keys on a keypad provided in the handset unit. A disadvantage of this configuration is that the apparatus is permanently installed in a motor vehicle and cannot be used outside the motor vehicle.

FIG. 2 illustrates a second known mobile cellular configuration which is adapted for transportable operation. In this configuration, the transceiver main unit 10 may be brought into the passenger compartment of the automobile, in which case it is connected to the vehicle battery via a cigarette lighter adapter 26. For transportable use, a portable cover 22 is provided which mounts over the transceiver main unit 10 and which usually contains a battery pack 24 for providing power in the transportable operation mode. A half-wave antenna 28 is also provided to the transceiver main unit 10. A disadvantage of this configuration is that the portable cover and battery pack must be repeatedly mounted and removed when shifting from in-vehicle to transportable use. This configuration is also bulky and complicated.

Also generally known is a transmobile cellular phone configuration in which the portable cover is replaced by a bag. While such configuration is designed for economy, the heavy and large nature of this configuration makes transportability of the apparatus somewhat cumbersome and inconvenient.

As such, there exists a need in the art for simplification, size reduction and cost reduction of class 1 type cellular mobile telephone apparatus which are adapted for in-vehicle installation as well as transportable use.

SUMMARY OF THE INVENTION

The present invention provides a novel cellular mobile telephone apparatus which solves the problems noted above, which greatly reduces electrical and mechanical design complexity and which achieves an apparatus having lower cost, smaller size and less weight than has heretofore been possible in conventional class 1 cellular mobile telephone apparatus.

Specifically, the present invention provides a cellular mobile telephone apparatus, comprising a main unit, including transceiver means for transmitting and receiving communication signals in the 800 Mhz frequency range, an antenna coupled to said transceiver means for transmitting and receiving radio waves containing said communication signals, a keypad including a plurality of alphanumeric keys for inputting signals for controlling operation of said apparatus, a microprocessor which controls operation of said apparatus in response to signals inputted from said keypad, and display means for displaying alphanumeric information inputted by said keypad; and a handset unit connected to said main unit by an electrical cord, consisting of a speaker for converting received audio signals of said transceiver means into audible sounds, a microphone for converting sounds into electrical signals to be transmitted by said transceiver means, and a battery pack for powering the apparatus in a transportable operational mode.

BRIEF DESCRIPTION OF THE DRAWINGS

The present invention will become more fully understood from the detailed description hereinbelow and the accompanying drawings, which are given by way of illustration only and are not limitative of the present invention, and wherein.

DETAILED DESCRIPTION OF THE PREFERRED EMBODIMENT

Figure 3:
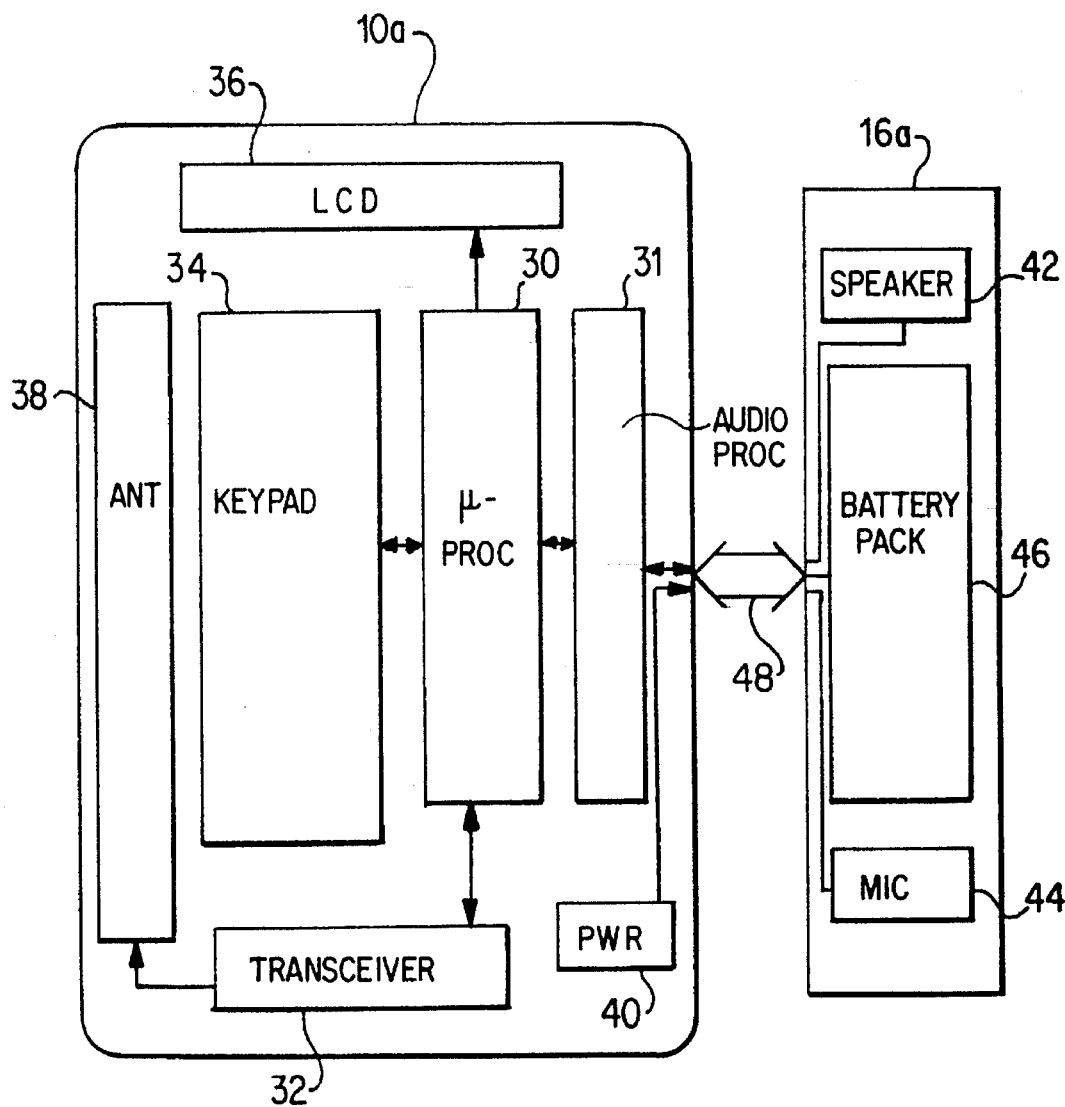
FIG. 3 is schematic block diagram of a class 1 cellular mobile telephone apparatus according to a preferred embodiment of the invention.

FIG. 3 shows a preferred embodiment of a cellular mobile telephone apparatus in accordance with the present invention.

According to the present invention, a transceiver main unit 10a is provided with an LCD display 36 and a keypad 34 in addition to an antenna 38, transceiver circuitry 32, a microprocessor 30, an audio processor 31 and power supply circuitry 40. By incorporating the LCD and keypad into the main transceiver unit, the handset unit 16a is substantially simplified. The handset unit 16a need only contain a speaker 42 and a microphone 44. Removal of the LCD and keypad from the handset unit eliminates the necessity for a separate microprocessor within the handset unit as in the conventional configuration, which was required for communication of the keypad signals with the microprocessor of the transceiver main unit as well as for displaying appropriate information on the LCD display, such as user actions and operational status of the apparatus. Such communication was effected through serial data transmission lines between the handset unit and the transceiver main unit. According to the present invention, the main microprocessor 30 of the transceiver main unit 10a directly processes the user activated functions from the keypad and also directly updates the information on the LCD display 36.

Additionally, according to the present invention the need for additional digital and analog circuitry to support the microprocessor and LCD in the handset unit are eliminated since the transceiver main unit circuitry is used for these functions. Further, since a microprocessor in the handset unit is eliminated, there is also no need for audio circuitry in the handset unit since the audio signals are transmitted directly between the audio processor 31 of the transceiver main unit 10a and the speaker 42 and microphone 44 of the handset unit 16a. As such, there is no longer any need to provide a printed circuit board in the handset unit. This will leave the handset unit with only the microphone and speaker as necessary internal components.

As a consequence, the present invention makes it possible to utilize the space within the handset unit for insertion of a battery pack 46 for supplying power to the apparatus in a transportable operation mode of the apparatus. All necessary conductors and wires between the handset unit 16a and the transceiver main unit are carried by a cord or cable 48 connecting the handset unit to the transceiver main unit. The cellular mobile telephone apparatus according to the present invention thus also eliminates the requirement for a portable cover to house a battery pack for transportable operation of the apparatus. A power supply circuit 40 is provided in the main unit 10a for connection to the vehicle battery when the apparatus is used in an automobile.

Figure 1:
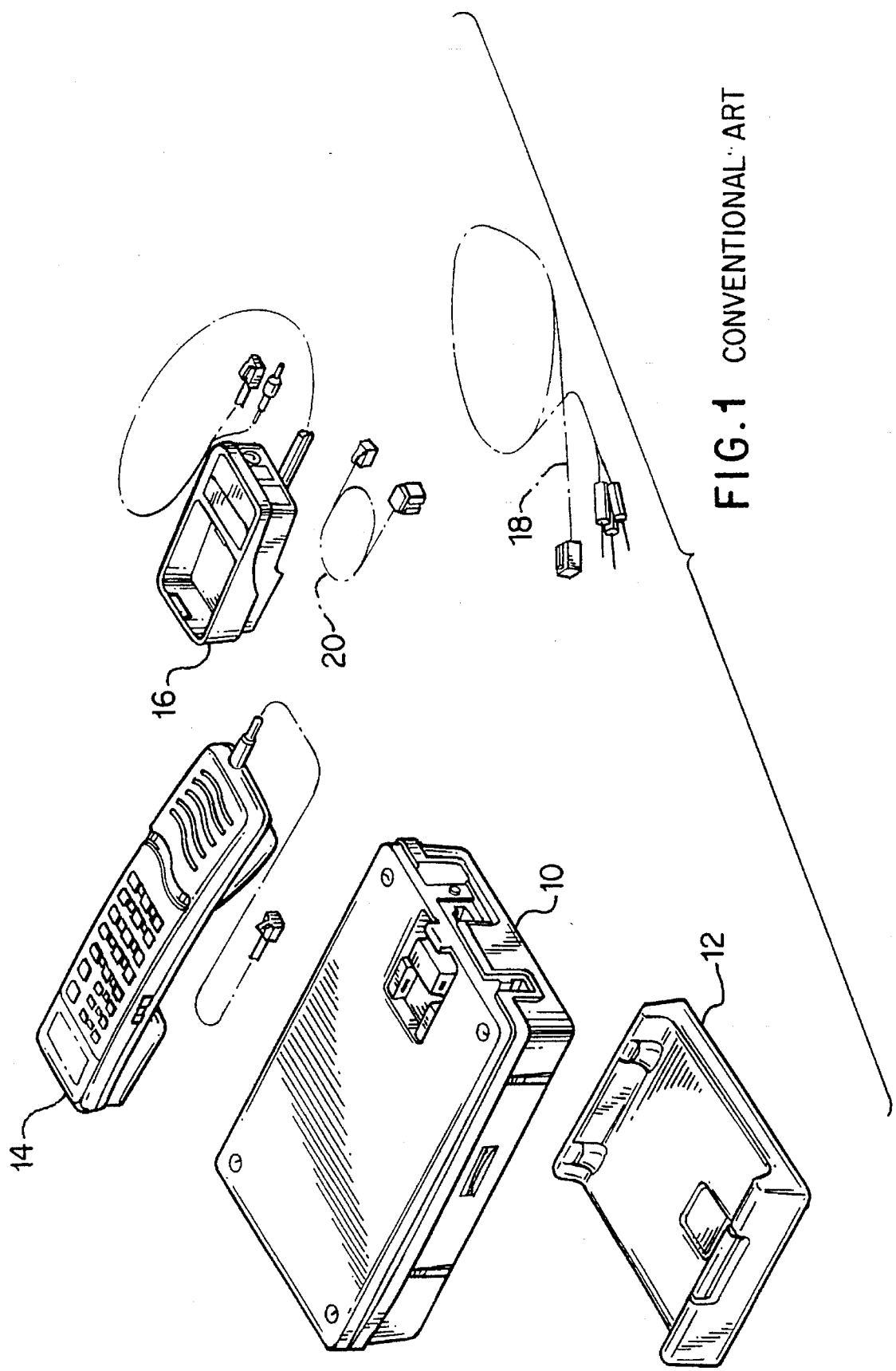
FIG. 1 is a diagram illustrating one conventional configuration of class 1 cellular mobile telephone apparatus for fixed installation in an automobile.
Figure 2:
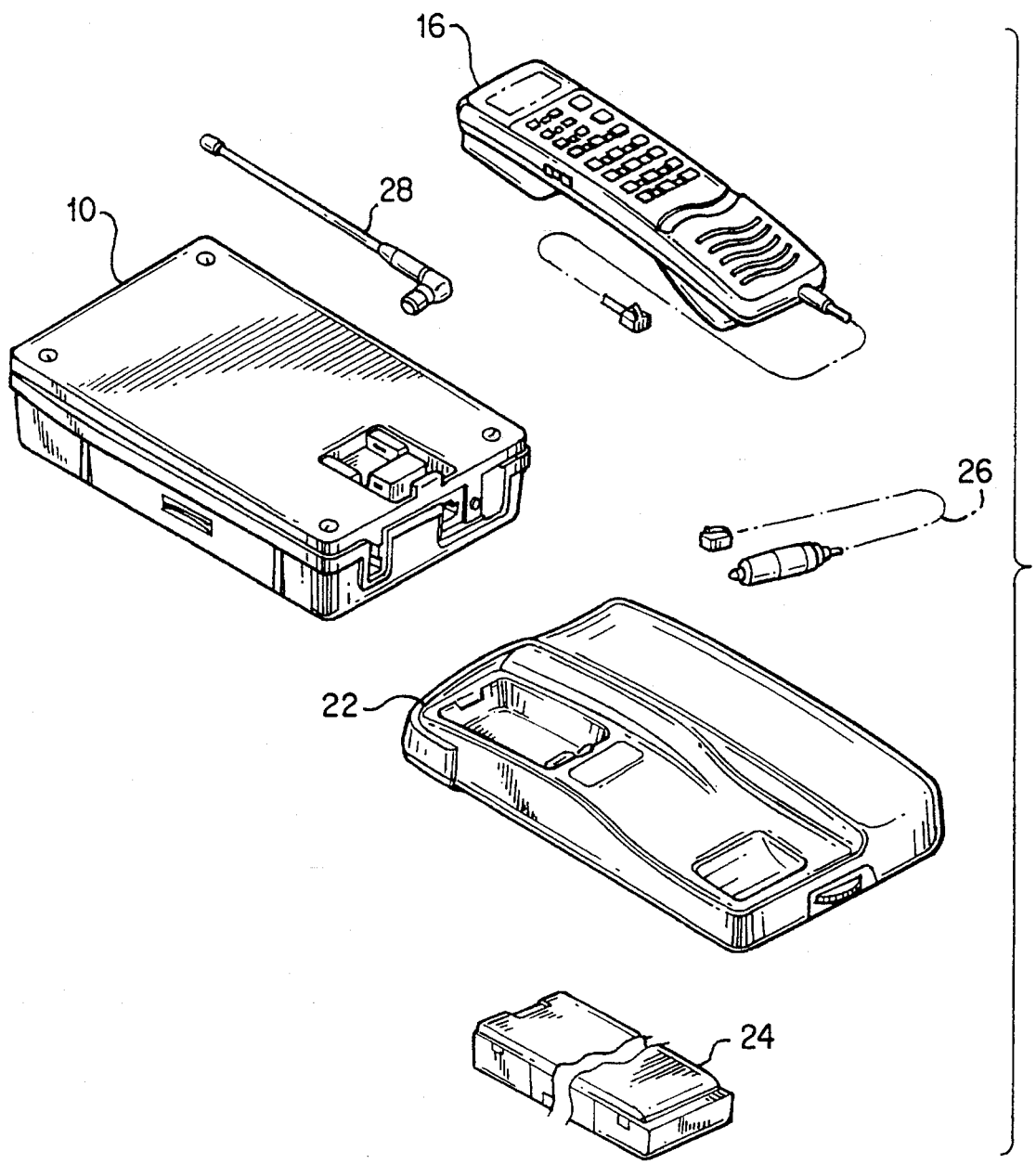
FIG. 2 is a diagram illustrating a second conventional configuration of class 1 cellular mobile telephone apparatus capable of transportable use.

The present invention thus provides for a small size, low weight cellular mobile telephone apparatus without sacrificing any of the cellular telephone features conventionally available to users of this technology. The present invention further allows the cellular mobile telephone apparatus to be installed directly in the passenger compartment of the automobile, thereby eliminating a number of peripheral accessories which were required by the conventional configurations as shown in FIGS. 1 and 2, such as the mounting bracket, handset unit cradle, and cable assemblies. The smaller size and compact nature of the apparatus enables it to be conveniently removed each time the user leaves his or her car.

Figure 4:
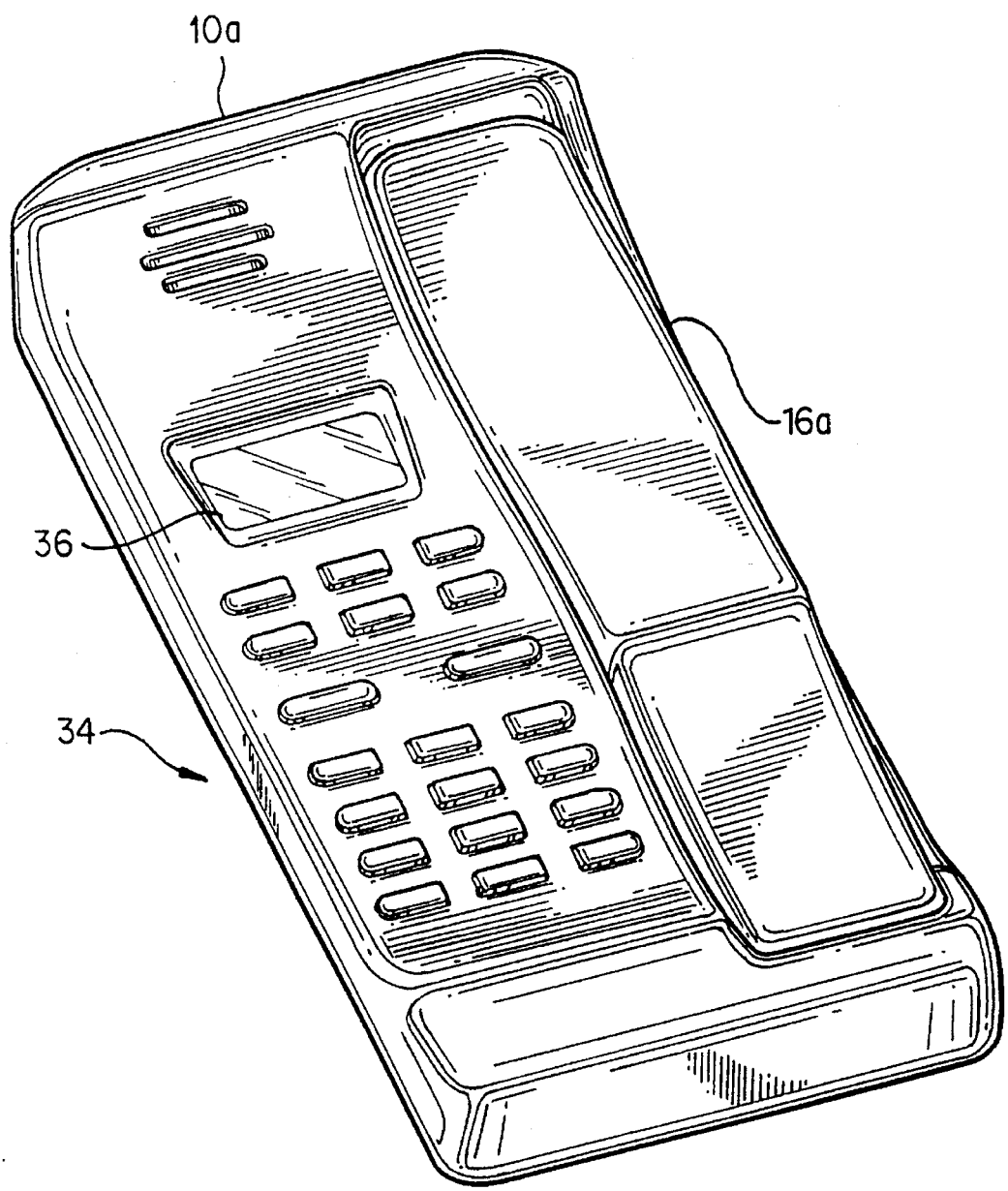
FIG. 4 is an isometric view of a cellular mobile telephone apparatus according to a preferred embodiment of the present invention.

FIG. 4 illustrates a perspective view of the novel cellular mobile telephone apparatus according to the present invention.

The invention having been thus described, it will be apparent to those skilled in the art that the same may be varied in many ways without departing from the spirit and scope of the invention. Any and all such modifications are intended to be included within the scope of the following claims.

What is claimed is:

1. A cellular mobile telephone apparatus, comprising:
   a main unit, including
      transceiver means for transmitting and receiving communication signals in the 800 Mhz frequency range,
      an antenna coupled to said transceiver means for transmitting and receiving radio waves containing said communication signals,
      a keypad including a plurality of alphanumeric keys for inputting signals for controlling operation of said apparatus,
      a microprocessor which controls operation of said apparatus in response to signals inputted from said keypad, and
      display means for displaying alphanumeric information inputted by said keypad; and
   a handset unit connected to said main unit by an electrical cord, consisting of
      a speaker for converting received audio signals of said transceiver means into audible sounds,
      a microphone for converting sounds into electrical signals to be transmitted by said transceiver means, and
      a battery pack for powering said apparatus in a transportable operational mode.

2. A cellular mobile telephone apparatus according to claim 1, wherein said apparatus is removably installed in the passenger compartment of a vehicle, said main unit further including power supply means connectable to a vehicle battery of said vehicle for providing power to said apparatus in an installed operational mode.

3. A cellular mobile telephone apparatus according to claim 1, wherein said display means comprises a liquid crystal display.

\* \* \* \* \*